United States Patent
Aithal

(10) Patent No.: US 8,081,626 B2
(45) Date of Patent: Dec. 20, 2011

(54) EXPEDITED COMMUNICATION TRAFFIC HANDLING APPARATUS AND METHODS

(75) Inventor: Prakasha Aithal, Ottawa (CA)

(73) Assignee: 4472314 Canada Inc., Ottawa, Ontario (CA)

( * ) Notice: Subject to any disclaimer, the term of this patent is extended or adjusted under 35 U.S.C. 154(b) by 627 days.

(21) Appl. No.: 11/826,979

(22) Filed: Jul. 19, 2007

(65) Prior Publication Data
US 2008/0019395 A1    Jan. 24, 2008

Related U.S. Application Data

(60) Provisional application No. 60/807,777, filed on Jul. 19, 2006.

(51) Int. Cl.
*H04H 20/67* (2008.01)
(52) U.S. Cl. .......... 370/389; 370/229
(58) Field of Classification Search .......... 370/230–234, 370/503, 467, 468, 395, 389–427, 352–356, 370/516–519; 709/203
See application file for complete search history.

(56) References Cited

U.S. PATENT DOCUMENTS

| | | | |
|---|---|---|---|
| 4,734,696 A | 3/1988 | Rogers | |
| 5,307,345 A | 4/1994 | Lozowick et al. | |
| 5,343,473 A | 8/1994 | Cidon et al. | |
| 5,497,371 A | 3/1996 | Ellis et al. | |
| 5,557,608 A | 9/1996 | Calvignac et al. | |
| 5,592,536 A * | 1/1997 | Parkerson et al. | 455/462 |
| 5,623,606 A | 4/1997 | Yokoyama et al. | |
| 5,812,534 A | 9/1998 | Davis et al. | |
| 6,552,975 B1 | 4/2003 | Tu et al. | |
| 6,633,564 B1 | 10/2003 | Steer et al. | |
| 6,687,247 B1 | 2/2004 | Bruce et al. | |
| 6,735,219 B1 | 5/2004 | Clauberg | |
| 6,891,855 B2 | 5/2005 | Bruckman | |
| 6,940,864 B2 * | 9/2005 | Abdelilah et al. | 370/412 |
| 7,668,125 B2 * | 2/2010 | Kadous | 370/310 |
| 2002/0044567 A1 * | 4/2002 | Voit et al. | 370/467 |

(Continued)

FOREIGN PATENT DOCUMENTS

EP    1826960 A1    8/2007

(Continued)

OTHER PUBLICATIONS

International Search Report issued on International Application No. PCT/CA2007/001263.

(Continued)

*Primary Examiner* — Pao Sinkantarakorn
*Assistant Examiner* — Iqbal Zaidi

(57) ABSTRACT

Expedited communication traffic handling apparatus and methods are disclosed. A traffic block that includes an amount of communication traffic that has been received on a receive communication link at a receive rate is to be transmitted on an output communication link at an output rate. A determination is made as to whether transmission of the traffic block at the output rate would be completed before a remaining amount of communication traffic to be included in the traffic block is received at the receive rate. Transmission of the traffic block is started, before all of the traffic that is to be included in the block is received, if transmission of the traffic block at the output rate would not be completed before the remaining amount of communication traffic is received. Early transmission may also or instead be enabled only for certain types of traffic. A pre-emptive scheduling scheme is also disclosed.

21 Claims, 6 Drawing Sheets

U.S. PATENT DOCUMENTS

| | | | |
|---|---|---|---|
| 2002/0057650 A1* | 5/2002 | Chuah et al. | 370/232 |
| 2003/0117964 A1* | 6/2003 | Chen et al. | 370/252 |
| 2005/0021621 A1 | 1/2005 | Welch et al. | |
| 2007/0130393 A1 | 6/2007 | Versteeg | |
| 2007/0268927 A1* | 11/2007 | Baba et al. | 370/437 |

FOREIGN PATENT DOCUMENTS

| | | |
|---|---|---|
| JP | 2002-33744 | 1/2002 |
| WO | WO 95/14337 | 5/1995 |
| WO | 02/065714 A2 | 8/2002 |
| WO | WO 2005/093995 A2 | 6/2005 |
| WO | WO 2006/032978 | 3/2006 |
| WO | WO2006032978 * | 3/2006 |

OTHER PUBLICATIONS

European Search Report dated Mar. 24, 2011 in respect of Application No. 07800422.3.

"Adjustable Dual Priority Interrupt Switching Method", IBM Technical Disclosure Bulletin, vol. 37, No. 8, Aug. 1994, pp. 649.

* cited by examiner

EXPEDITED COMMUNICATION TRAFFIC HANDLING APPARATUS AND METHODS

CROSS-REFERENCE TO RELATED APPLICATION

This application claims the benefit of U.S. Provisional Patent Application Ser. No. 60/807,777, entitled "EXPEDITED COMMUNICATION TRAFFIC HANDLING APPARATUS AND METHODS", and filed on Jul. 19, 2006, the entire contents of which are incorporated herein by reference.

FIELD OF THE INVENTION

This invention relates generally to communications and, in particular, to expedited handling techniques for communication traffic.

BACKGROUND

Communication networks can be implemented in any of various forms. Ethernet networks, for example, can be realized using meshed or ringed network architectures. Time sensitive communication traffic such as voice and/or video traffic traversing these networks should be given special treatment to reduce jitter. Ensuring that these types of traffic streams experience low jitter can be important to reduce the amount of impairment when such streams are reconstructed at a receiving device.

When a communication network includes wireless communication links, the wireless links can become bottlenecks, and subject time sensitive traffic to higher jitter. While switching/routing nodes in a wired network or a wired portion of a combined wired/wireless network might offer traffic prioritizing/expediting methods to reduce jitter, such a scheme alone is not effective to reduce jitter in wireless links. Time sensitive traffic, especially when traversing wireless communication links, could be subjected to relatively high jitter, which can lead to poor quality reconstructed traffic streams.

Although dedicated traffic channels could be maintained throughout a network to reduce delay and/or jitter, this is not practical in packet networks. Reserving bandwidth through dedicated channels or other mechanisms can lead to bandwidth being wasted when traffic for which bandwidth has been reserved is not present. This type of method is used in synchronous Time Division Multiplexing (TDM) networks.

SUMMARY

Thus, there remains a need for improved traffic handling mechanisms.

Some embodiments of the present invention relate to mechanisms that can be employed in wireless links to improve jitter performance for time sensitive traffic. A traffic classification/prioritizing scheme may be used, in combination with a no-drop "cut-through" traffic pre-emption scheme at the wireless interface layer. Deterministic frame advancing may also or instead be provided. These schemes are not necessarily inter-dependent and therefore could be applied individually or together to reduce jitter of time sensitive traffic.

According to an aspect of the invention, there is provided an apparatus that includes a transmitter operable to transmit a traffic block, the traffic block comprising an amount of communication traffic received on a receive communication link, and a transmission controller, operatively coupled to the transmitter, for controlling transmission of the traffic block. The transmission controller is operable to determine whether transmission of the traffic block at an output rate of the transmitter would be completed before a remaining amount of communication traffic to be included in the traffic block is received on the receive communication link at a receive communication rate of the receive communication link, and to cause the transmitter to begin transmitting the traffic block where transmission of the traffic block at the output rate would not be completed before the remaining amount of communication traffic is received.

The apparatus may also include a communication rate determination module operatively coupled to the transmission controller and operable to determine the output rate and the receive communication rate.

Where the traffic block has a predetermined size, the apparatus may also include a remaining traffic amount determination module operatively coupled to the transmission controller and operable to determine the remaining amount of communication traffic based on the predetermined size of the traffic block and an amount of communication traffic received on the receive communication link for inclusion in the traffic block.

In some embodiments, the apparatus also includes a traffic type determination module operatively coupled to the transmission controller and operable to determine whether communication traffic received on the receive communication link is a predetermined type of a plurality of types of communication traffic. In this case, the transmission controller is operable to cause the transmitter to begin transmitting a traffic block comprising the received communication traffic before all communication traffic to be included in the traffic block is received on the receive communication link only where the received communication traffic is the predetermined type of communication traffic. A memory may be operatively coupled to the transmitter for storing traffic blocks to be transmitted by the transmitter, the memory comprising respective stores for storing traffic blocks that comprise communication traffic of the plurality of types.

The apparatus may include a memory, operatively coupled to the transmitter and to the transmission controller, comprising a store for storing the traffic block. The transmission controller may then be operable to control transmission of the traffic block by controlling output of the traffic block from the memory to the transmitter.

At least one of the transmitter and the transmission controller may be implemented in software for execution by one or more processing elements.

A method is also provided, and includes receiving communication traffic on a receive communication link at a receive communication rate, generating from the received communication traffic a traffic block for transmission at an output rate, determining whether transmission of the traffic block at the output rate would be completed before a remaining amount of communication traffic to be included in the traffic block is received on the receive communication link at the receive communication rate, and causing transmission of the traffic block to begin where transmission of the traffic block would not be completed before the remaining amount of communication traffic is received.

The method may also involve determining whether communication traffic received on the receive communication link is a predetermined type of a plurality of types of communication traffic. The operation of causing may then involve causing transmission of the traffic block to start before all communication traffic to be included in the traffic block is received on the receive communication link only where the received communication traffic is the predetermined type of communication traffic. An operation of storing traffic blocks including communication traffic of the plurality of types may also be performed.

In some embodiments, the method may also involve storing the traffic block in a memory, in which case causing includes causing output of the traffic block from the memory to an output communication link.

The method may be provided in the form of instructions stored on a machine-readable medium.

Another aspect of the invention provides an apparatus that includes a communication traffic type determination module operable to receive communication traffic on a receive communication link, and to determine whether the received communication traffic is a predetermined type of a plurality of types of communication traffic, and a transmission controller operatively coupled to the communication traffic type determination module and operable to control transmission of a traffic block comprising an amount of the received communication traffic, the transmission controller enabling transmission of a traffic block comprising received communication traffic of the predetermined type to start at a time before all communication traffic to be included in the traffic block is received on the receive communication link.

The communication traffic type determination module may be operable to determine whether the received communication traffic is the predetermined type of traffic based on at least one of: an indication of type in a received communication traffic stream, and an indication that a received stream of communication traffic was interrupted to transmit the received communication traffic.

The apparatus may also include a traffic block generator operatively coupled to the communication traffic type determination module and operable to generate traffic blocks for transmission, and a memory operatively coupled to the traffic block generator for storing the traffic blocks. In this case, the traffic block generator may be further operable to maintain respective traffic block buffers in the memory for an interrupted communication traffic stream and an interrupting communication traffic stream where a stream of communication traffic was interrupted to transmit the received communication traffic.

In some embodiments, the transmission controller enables transmission of a traffic block comprising received communication traffic of the predetermined type to start at a time when transmission of the traffic block at an output rate would not be completed before a remaining amount of communication traffic to be included in the traffic block is received on the receive communication link at a receive communication rate of the receive communication link.

At least one of the communication traffic type determination module and the transmission controller may be implemented in software for execution by one or more processing elements.

A method according to yet another aspect of the invention includes receiving communication traffic on a receive communication link, determining whether the received communication traffic is a predetermined type of a plurality of types of communication traffic, and enabling transmission of a traffic block comprising the received communication traffic to start at a time before all communication traffic to be included in the traffic block is received on the receive communication link, where the received communication traffic is the predetermined type of communication traffic.

The operation of determining may involve detecting, in a received communication traffic stream, at least one of: an indication of traffic type, and an indication that communication traffic of a different type was interrupted to transmit the received communication traffic.

In some embodiments, enabling involves causing transmission of the traffic block to start at a time when transmission of the traffic block at an output rate would not be completed before a remaining amount of communication traffic to be included in the traffic block is received on the receive communication link at a receive communication rate of the receive communication link.

The method may be embodied, for example, in instructions stored on a machine-readable medium.

A further aspect of the invention provides an apparatus that includes a communication traffic sorter operable to determine to which traffic group of a plurality of traffic groups received communication traffic belongs, and a communication traffic transfer module, operatively coupled to the communication traffic sorter, and operable to transfer received communication traffic of a predetermined traffic group of the plurality of traffic groups into a communication traffic stream for transmission to a receiving communication device, to transfer received communication traffic of a traffic group other than the predetermined traffic group into the communication traffic stream where no received communication traffic belongs to the predetermined traffic group, and to interrupt transfer of received communication traffic of the other traffic group into the communication traffic stream in order to transfer traffic of the predetermined traffic group into the communication traffic stream where communication traffic of the predetermined traffic group is received during transfer of communication traffic of the other traffic group to the communication traffic stream.

The communication traffic transfer module may be further operable to include in the communication traffic stream an indication of traffic of the predetermined traffic group, the indication causing the receiving communication device to begin transmitting a traffic block that includes traffic belonging to the predetermined traffic group before the receiving communication device receives an amount of communication traffic to be included in the traffic block.

The indication may include at least one of: an indication of the traffic group to which communication traffic in the communication traffic stream belongs, an indication of a switch in the communication traffic stream from traffic of one traffic group to traffic of the predetermined traffic group, and an indication of a switch in the communication traffic stream from traffic of one traffic flow to traffic of a different traffic flow before all traffic of the one traffic flow has been transferred into the communication traffic stream.

There is also provided a method that includes determining to which traffic group of a plurality of traffic groups received communication traffic belongs, transferring received communication traffic of a predetermined traffic group of the plurality of traffic groups, or, where no received communication traffic belongs to the predetermined traffic group, received communication traffic of another traffic group, into a communication traffic stream for transmission to a receiving communication device, and interrupting transfer of received communication traffic of the other traffic group into the communication traffic stream in order to transfer traffic of the predetermined traffic group into the communication traffic stream where communication traffic of the predetermined traffic group is received during transfer of communication traffic of the other traffic group into the communication traffic stream.

The method may also involve including in the communication traffic stream an indication of traffic of the predetermined traffic group, the indication causing the receiving communication device to begin transmitting a traffic block that includes traffic belonging to the predetermined traffic group before the receiving communication device receives an amount of communication traffic to be included in the traffic block.

A machine-readable medium may be used to store instructions which when executed perform the method.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
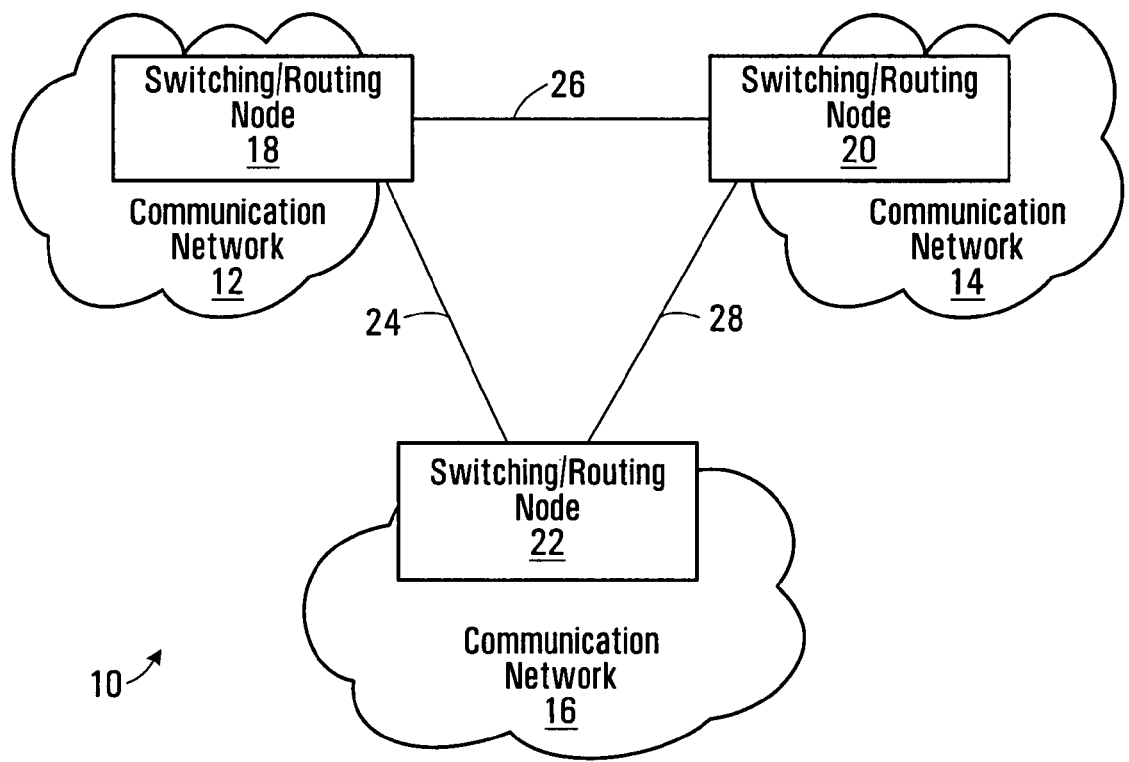
FIG. 1 is a block diagram of a communication system.

FIG. 1 is a block diagram of a communication system 10, which includes communication networks 12, 14, 16. Switching/routing nodes 18, 20, 22 that are at least coupled to or, as shown, form part of the communication networks 12, 14, 16 enable communications between the communication networks through wired communication links 24, 26, 28. Although the communication networks 12, 14, 16 may include many nodes, only one node per network is shown in FIG. 1 to avoid overly complicating the drawing.

Those skilled in the art will be familiar with various communication systems having a general structure similar to that of the system 10, the types of communication equipment such as the switching/routing nodes 18, 20, 22 provided in such systems, and the operation thereof. The system 10 might be a wired Ethernet mesh/ring network with the three switching/routing nodes 18, 20, 22 interconnecting different user networks 12, 14, 16, for instance. Since the present invention is not specific to any particular type of communication system, network, or link, communication system operation is described only briefly herein to the extent necessary to convey an understanding of embodiments of the invention.

In advanced networking applications, different types of communication traffic, each of which can sustain a different level of latency and variation in latency (jitter), might be transferred in a communication system. Suppose that traffic originating from the communication network 16 contains time insensitive traffic such as data and time sensitive traffic such as voice or video. The time sensitive traffic should ideally experience the least amount of latency (delay) in the communication system 10. As the traffic passes through a network element such as the switching/routing node 22, latency might not remain constant. Latency may vary based on the size of a preceding packet or other type of traffic block currently being processed by the network element, for instance. This variation in latency causes end-to-end jitter in traffic.

Conventional switching/routing nodes attempt to reduce latency by means of Quality of Service (QoS) mechanisms. In the above example, the switching/routing nodes 22, 18 may be configured to expedite the time sensitive traffic from the communication network 16 over other traffic and provide for faster delivery of that traffic.

While such a mechanism may serve, to some extent, in helping reduce latency, it does not reduce jitter, which is a variation in latency. In general, the jitter problem for time insensitive traffic worsens with larger packet or block sizes used in a communication system. If a packet of time sensitive traffic arrives at a switching/routing node while that node is processing a time insensitive or lower priority packet, then according to conventional techniques the time sensitive traffic is buffered at the node and has to await completion of processing, including transmission, of the previous packet.

Figure 2:
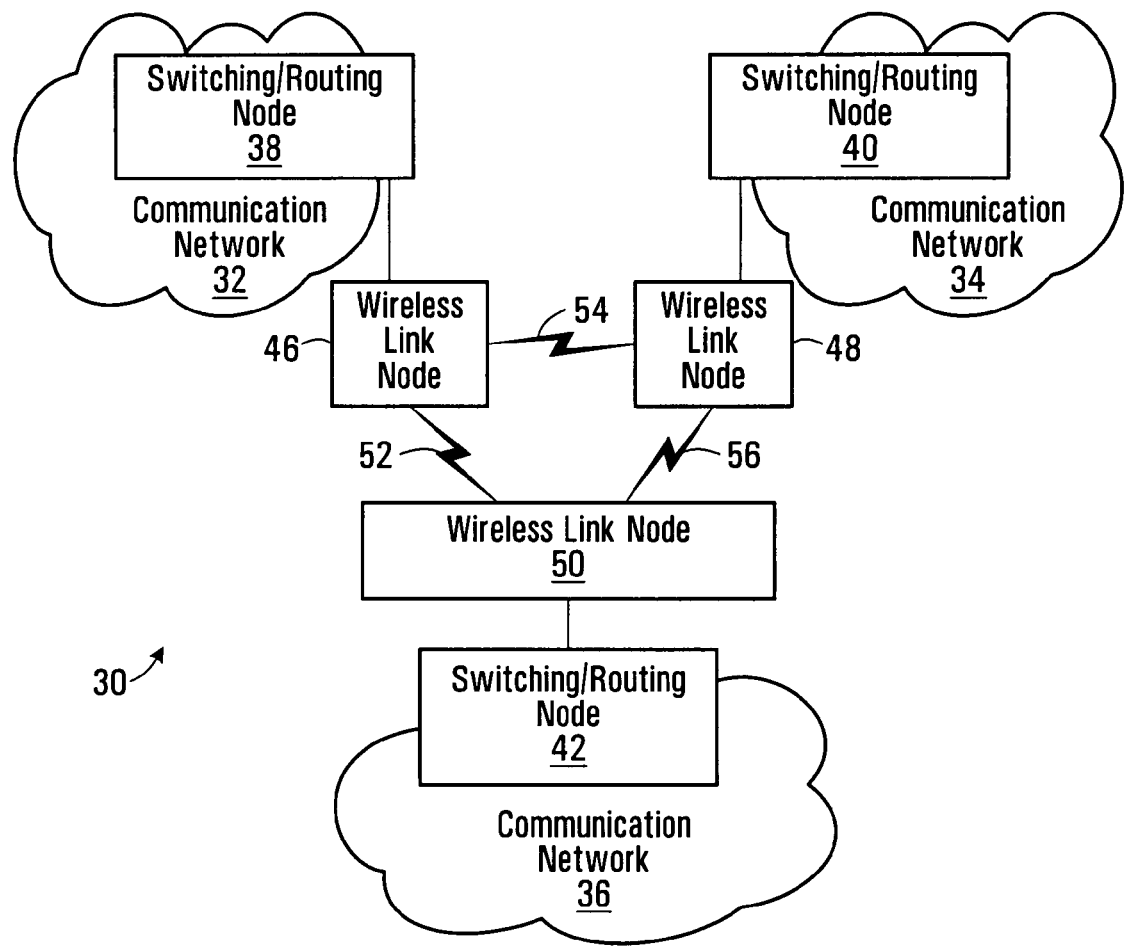
FIG. 2 is a block diagram of a communication system incorporating wireless communication links.

In wireless ring/mesh network configurations, one or more of the wired links 24, 26, 28 in the system 10 is replaced with a corresponding wireless link. FIG. 2 is a block diagram of a communication system that incorporates wireless links. In the system 30, switching/routing nodes 38, 40, 42 in communication networks 32, 34, 36 are operatively coupled to respective wireless link nodes 46, 48, 50. The wireless link nodes 46, 48, 50 enable the switching/routing nodes 38, 40, 42, and thus the communication networks 32, 34, 36, to communicate over wireless communication links 52, 54, 56.

Wireless links such as 52, 54, 56 usually have lower bandwidth than wired network connections, and therefore can subject time sensitive traffic to higher latency variation.

In an Ethernet mesh/ring system, there may be a need to reduce the latency and/or jitter affecting certain types of traffic. While in wired networks latency can be limited by applying QoS mechanisms at switching/routing nodes, time sensitive traffic will still be subjected to variations in latency.

Figure 3:
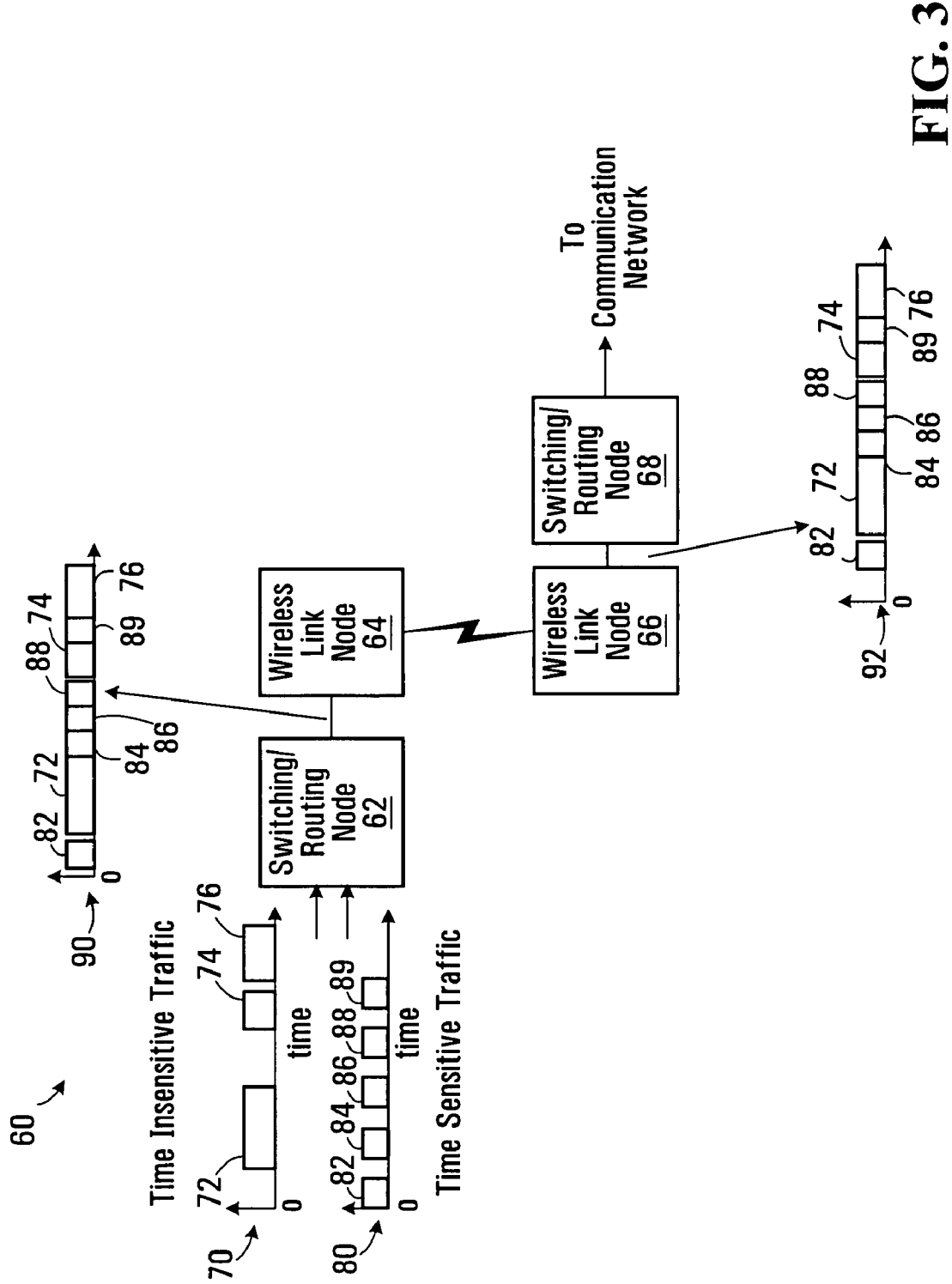
FIG. 3 is a block diagram illustrating an effect of jitter on time insensitive and time sensitive communication traffic.

FIG. 3 is a block diagram illustrating an effect of jitter on time insensitive and time sensitive communication traffic, in the context of two switching/routing nodes 62, 68 that exchange traffic through wireless link nodes 64, 66 and a wireless link.

As shown at 70, 80, a switching/routing node 62 might receive blocks 72, 74, 76 of time insensitive traffic 70 and blocks 82, 84, 86, 88, 89 of time sensitive traffic 80, both of which can be subjected to latency and jitter.

At ingress to the wireless link through the wireless link node 64, the time sensitive traffic 80 can be delayed until other preceding traffic is processed by the switching/routing node 62 and transported to the wireless link node 64. This is represented at 90. A conventional switching/routing node 62 might receive and output the first block 82 of the time sensitive traffic 80 to the wireless link node 64 for transmission on the wireless link.

Before the second block 84 of the time sensitive traffic is received, however, the switching/routing node 62 receives the first block 72 of the time insensitive traffic 70. Although the second block 84 of the time sensitive traffic 80 should be processed as quickly as possible by the switching/routing node 62, the node is already processing the block 72 of time insensitive traffic and completes its processing, including transmission, of the block 72 before proceeding with processing of the block 84. The traffic block 84 and similarly the block 86, which is also received before processing of the block 72 is complete, are buffered at the switching/routing node 62.

The time sensitive blocks 84, 86, and the subsequent block 88, are then processed and output to the wireless link node 64.

Blocks 74, 89, and 76 are then similarly processed in the sequence in which they are received by the switching/routing node 62.

As will be apparent from the stream 90, blocks of the time sensitive traffic 80 can be subjected to different amounts of latency at different times due to the time insensitive traffic 70.

A communication traffic stream as received and output by the wireless link node 66 is shown at 92. The sequence of traffic blocks in the received stream 92 is the same as in the transmitted stream 90, although the blocks are delayed due to latency in the wireless communication link.

In the traffic stream 92 received by the switching/routing node 68, the spacing of the time sensitive traffic is substantially different than that of the original stream 80, which will affect reconstruction of signals carried in the time sensitive traffic 80. If received signals could be reconstructed at all, original continuous audio signals would be broken and original video signals would not flow properly. Jitter also affects the time insensitive traffic, but does not pose a problem for such traffic.

According to embodiments of the invention, time sensitive traffic may pre-empt other traffic. At a receiving device that transfers received traffic to other devices or systems in specific frames, packets, or some other form of traffic block, transfer of a traffic block that includes time sensitive traffic may be started before the entire amount of traffic for a complete traffic block has been received. These techniques can reduce jitter, latency, or both.

Figure 4:
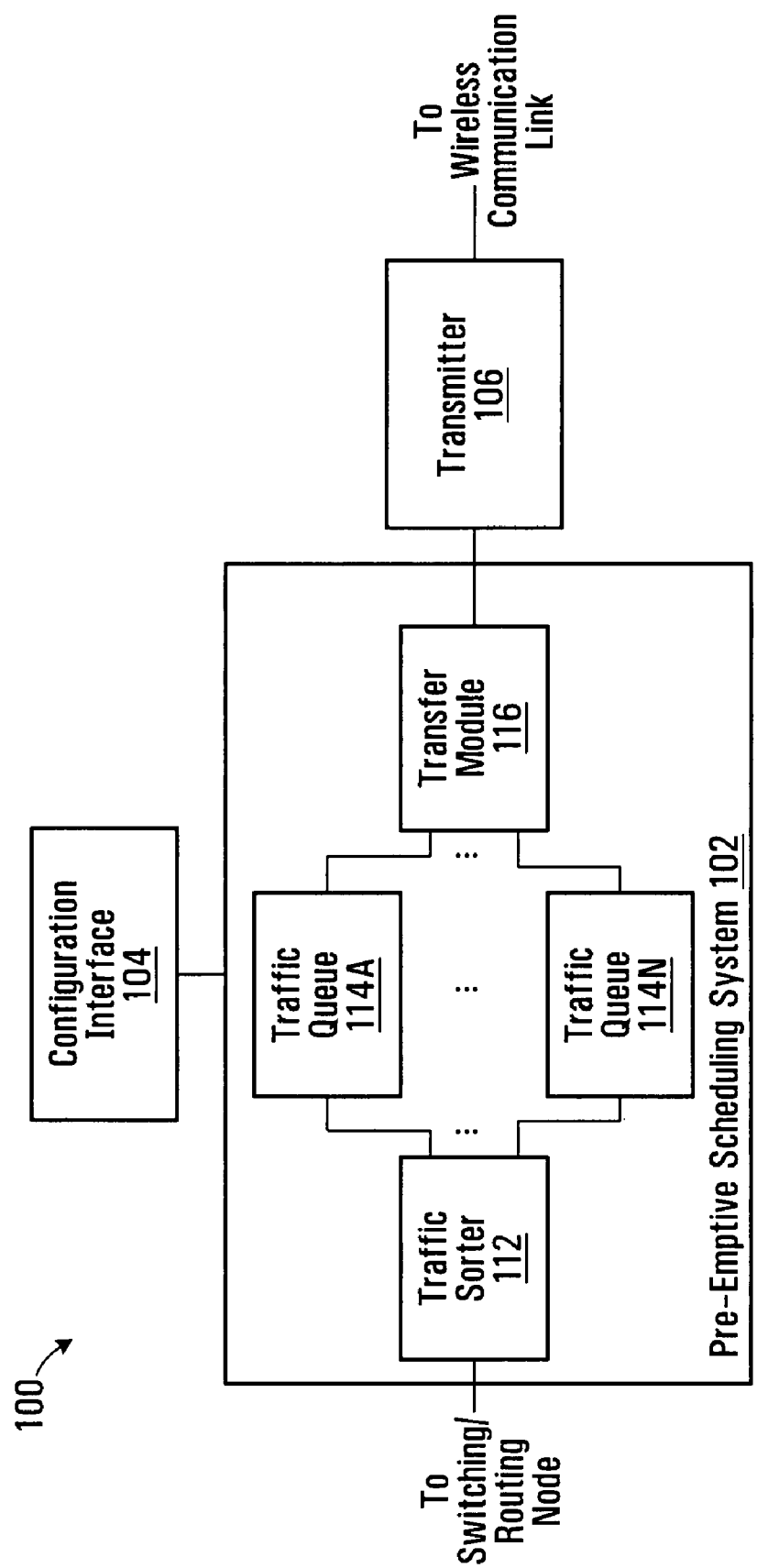
FIG. 4 is a block diagram of an apparatus according to an embodiment of the invention.

FIG. 4 is a block diagram of an apparatus according to an embodiment of the invention. The apparatus 100 includes a pre-emptive scheduling system 102 operatively coupled to a configuration interface 104 and to a transmitter 106. In the pre-emptive scheduling system 102, a traffic sorter 112 is operatively coupled to a plurality of traffic queues 114A through 114N, which are operatively coupled to a transfer module 116. The transfer module 116 is operatively coupled to the transmitter 106.

Figure 5:
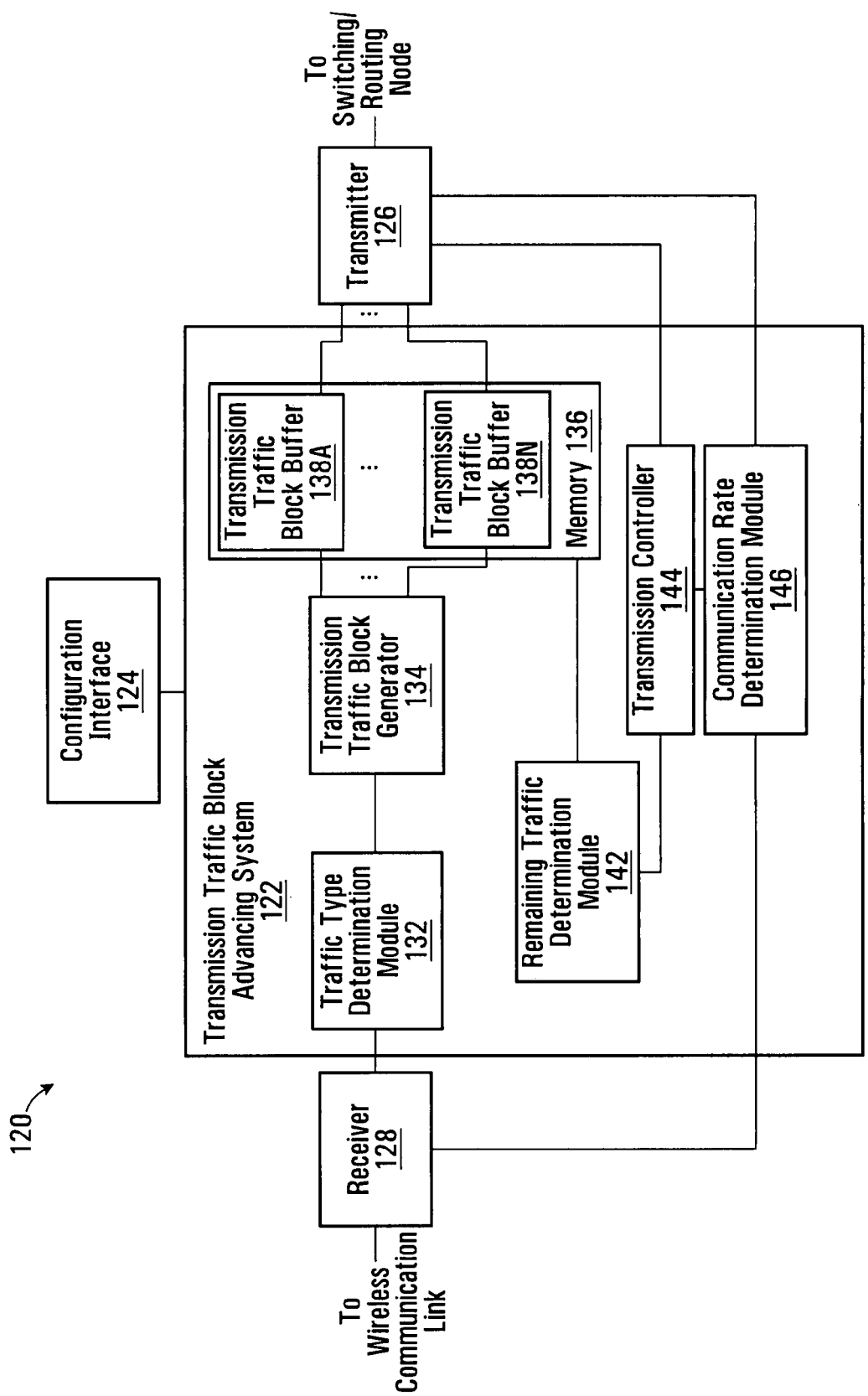
FIG. 5 is a block diagram of an apparatus according to another embodiment of the invention.
Figure 6:
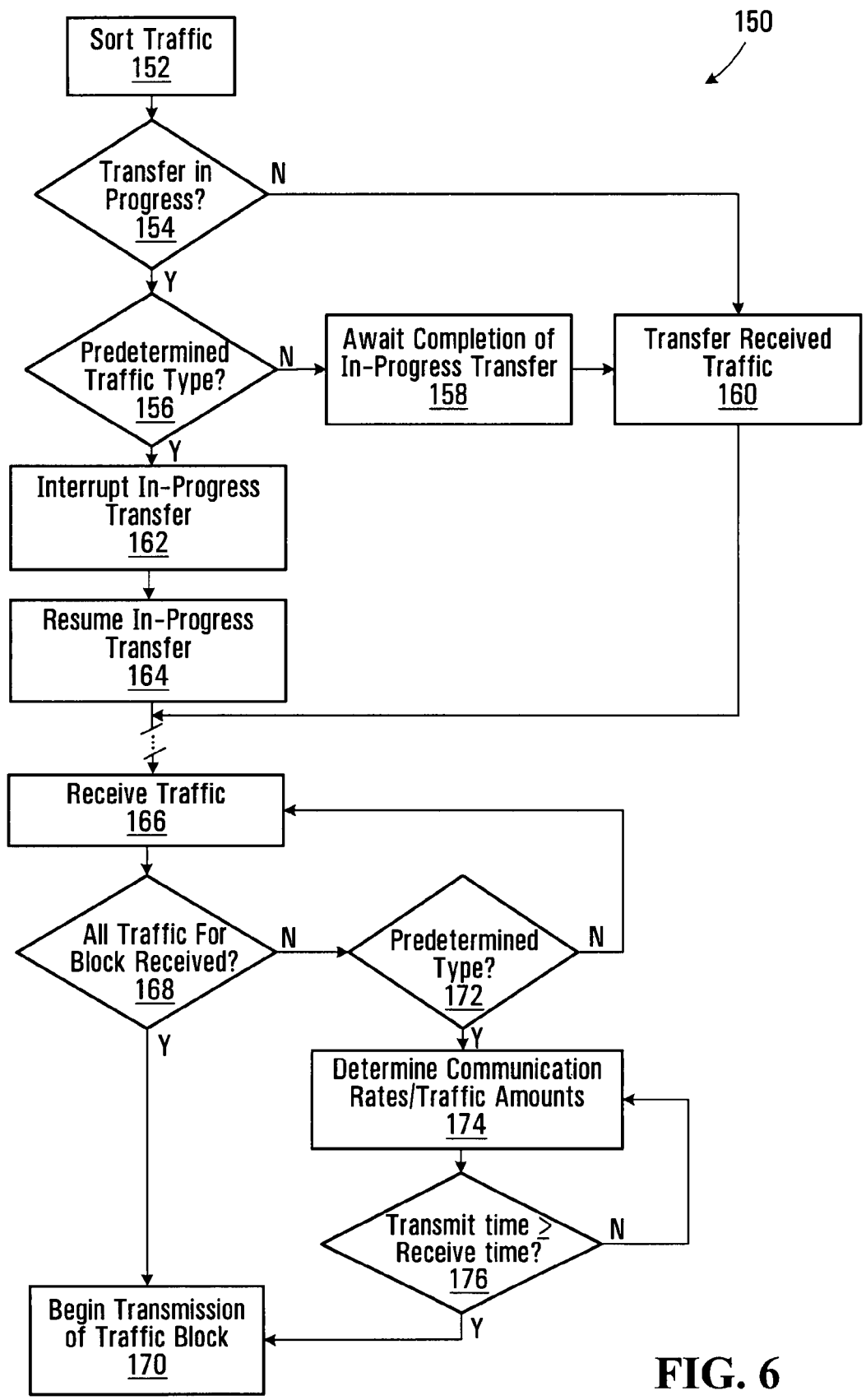
FIG. 6 is a flow diagram of a method according to another embodiment of the invention.

It should be appreciated that a network element or other communication equipment or device in which the apparatus 100 is implemented may include components in addition to those explicitly shown in FIG. 4. Thus, the contents of FIG. 4, as well as FIGS. 5 and 6, are intended solely for illustrative purposes and not to limit the scope of the present invention. Other embodiments of the invention may include further, fewer, or different elements operatively coupled in a similar or different manner than explicitly shown. In some embodiments, it is possible to enable or disable components such as the traffic sorter 112 through configuration of a pre-emptive scheduling system such that different components may be active in different deployments.

The various components of the pre-emptive scheduling system 102 may be implemented using hardware, software for execution by one or more processing elements, firmware, or some combination thereof. The operative couplings between these components therefore need not necessarily be physical connections. Software components might access the same memory locations or common variables, for example, and thereby be operatively coupled through a logical connection.

Given the many possible implementations of the components of the pre-emptive scheduling system 102, these components are described below primarily in terms of their respective functions. Based on these functional descriptions, a person skilled in the art would be enabled to implement embodiments of the invention in any of many different ways.

The configuration interface 104 may also be implemented using hardware, software, firmware, or some combination thereof. The specific structure and operation of the configuration interface 104 is at least to some extent implementation-dependent. In one possible implementation of the apparatus 100, the apparatus is incorporated into each wireless link node 46, 48, 50 (FIG. 2) at which pre-emptive scheduling for a wireless communication link is to be applied. Multiple instances of the apparatus 100 may be provided for respective wireless links supported by a node. For node-based implementations of the apparatus 100, the configuration interface 104 may include an interface to a Network Management System (NMS), such as a Command Line Interface (CLI), through which an operator may enter control information.

An authentication procedure or other protection mechanism may be implemented in the configuration interface 104 to control access to the pre-emptive scheduling system 102. Access control may be used to prohibit unauthorized attempts to change traffic handling priorities for a particular wireless communication link, for instance.

The configuration interface 104 may also or instead support the exchange of control information with a remote apparatus with which the apparatus 100 communicates through a wireless communication link. This type of exchange could be supported, for example, through dedicated control channels between communication equipment, in-band signalling on a wireless communication link, or some other mechanism. Where in-band signalling is supported, the configuration interface 104 may be operatively coupled to the transmitter 106 and possibly also to a receiver.

The transmitter 106 is another component that may be implementation-dependent. In one embodiment, the transmitter 106 includes such elements as an encoder, a modulator, an amplifier, and one or more antennas in a transmit signal path. Components for performing corresponding inverse functions could also be provided in a receive signal path. Embodiments of the invention may thus be implemented in conjunction with a transmitter only, with separate transmitter and receiver modules, or with a transceiver that supports both transmit and receive functions.

In operation, the traffic sorter 112 receives communication traffic and determines a type of the received traffic, to thereby sort or categorize the received traffic. Traffic types may be associated with different traffic classes, priorities, or more generally groups of communication traffic that share some common characteristic. Traffic is received from a switching/routing node in the example shown in FIG. 4. It should be appreciated, however, that the present invention is in no way limited to this arrangement, and that communication traffic could be received from any of various types of systems or devices over any of many types of links in other embodiments.

The groups into which incoming communication traffic is sorted by the traffic sorter 112 may be configurable through the configuration interface 104. The number of groups, respective traffic inclusion criteria for each group, and possibly other parameters may be provided to the pre-emptive scheduling system 102 to initially configure or change the traffic sorting mechanism applied by the traffic sorter 112.

Communication traffic may be sorted based on any of various characteristics, including but not limited to its content (e.g., voice, data, or control), priority, class, source, destination, service level, etc. In general, the traffic sorter 112 sorts blocks of traffic, which may be packets, cells, or some other form of traffic unit. In the case of packets, the traffic sorter 112 may access information in the header of each packet to determine to which group the packet belongs.

The traffic queues 114A through 114N represent one example of an arrangement through which the traffic groups can be managed. Each of the traffic queues 114A through 114N may correspond to one traffic group. In some embodiments, the length of each of the traffic queues 114A through 114N is configurable through the configuration interface 104. Different queue lengths might be implemented, for example, by assigning multiple fixed-length queues to a single traffic group. Once received communication traffic has been classified, the traffic sorter 112 determines to which one of the traffic queues 114A through 114N traffic of the determined group should be stored, and stores the traffic to that queue. Group to queue mapping may be determined by accessing a lookup table in memory (not shown), for example.

The transfer module 116 combines the communication traffic from the traffic queues 114A through 114N into a communication traffic stream for transmission by the transmitter 106. In accordance with an embodiment of the invention, handling of a certain type of traffic is expedited by the transfer module 116. For illustrative purposes, suppose that the traffic sorter 112 sorts traffic into time sensitive traffic and time insensitive traffic, and that the transfer module 116 is adapted to give precedence to the time sensitive traffic. Although this example is used to explain one embodiment of the invention in detail, it should be appreciated that other traffic types, possibly including multiple expedited types, are also contemplated.

In the above example, received time sensitive communication traffic is stored in its corresponding queue, illustratively the traffic queue 114A, and transferred by the transfer module 116 into a communication traffic stream for transmission by the transmitter 106, as it is received. If no time sensitive traffic is currently stored in the traffic queue 114A, then the transfer module 116 transfers received time insensitive traffic from the traffic queue 114N into the communication traffic stream.

According to an aspect of the invention, the transfer module 116 also interrupts the transfer of received time insensitive traffic into the transmit traffic stream in order to transfer time sensitive traffic, when time sensitive traffic is received during transfer of time insensitive traffic. Instead of waiting until transfer of time insensitive traffic is complete, the pre-emptive scheduling system 102 can interrupt time insensitive traffic to transmit time sensitive traffic. This represents a significant advantage over conventional techniques.

The pre-emptive scheduling system 102 thus identifies and expedites the processing and transmission of time sensitive traffic, or other traffic that is to be given special handling to reduce latency and/or jitter.

With reference to FIG. 3, for example, pre-emptive scheduling could be used to interrupt the transfer of time insensitive traffic 70 when time sensitive traffic 80 is received. In this case, the traffic stream 90 might include block 82, a portion of block 72, and then blocks 84, 86, 88, 89 of the time sensitive traffic 80 interspersed with portions of blocks 72, 74, 76 of the time insensitive traffic 70.

Traffic pre-emption may be accomplished using any of several techniques. In general, a no-loss cut-through mechanism may be preferred. According to this approach, when expedited traffic is available and other traffic is currently in transit, transmission of the other traffic is temporarily stopped, and transmission of the expedited traffic is started and continues until all expedited traffic has been transmitted. Transmission of any remaining interrupted traffic then resumes, guaranteeing no loss of non-expedited traffic.

An approach of this type helps to reduce jitter, while avoiding loss of other traffic. Traffic that is interrupted so that expedited traffic can be transmitted might already have been processed by a policing mechanism, for example, and therefore it may be desirable not to lose such traffic. It might otherwise be necessary to repeat transmission-related processing of interrupted traffic for retransmission. Many transfer schemes simply discard partial traffic blocks, for instance, in which case retransmission of a complete interrupted block of traffic, and possibly re-processing of that block for transmission, would be necessary to avoid receive errors. A no-loss mechanism supports resumption, instead of restarting, of transmission of an interrupted traffic block.

Consider an illustrative example of an apparatus 100 that is designed to transfer Ethernet frames received from a switching/routing node over a wireless communication link in radio frames that each include a payload of 220 bytes, into which portions of one or more Ethernet frames may be inserted. In one embodiment, the radio frames are 223 bytes in total length and also include a 3-byte header, although other implementations are possible.

When an Ethernet frame that includes time sensitive traffic is received, the traffic sorter 112 identifies the frame as expedited traffic, and stores the frame to the corresponding traffic queue, illustratively the traffic queue 114A. The transfer module 116 detects the stored frame in the expedite queue 114A, builds a radio frame including up to 220 bytes of the Ethernet frame, and provides the radio frame to the transmitter 106 for transmission. Additional radio frames are generated and transmitted where the Ethernet frame is longer than 220 bytes.

Non-expedited traffic may be handled in a similar manner when there is no expedited traffic awaiting transmission. If the transfer module 116 is currently building a radio frame that includes a portion of a non-expedited Ethernet frame when an expedited Ethernet frame is received, it interrupts the in-progress Ethernet frame (cut-through) and inserts at least a portion of the expedited Ethernet frame traffic into that same radio frame. Depending on the size of the expedited Ethernet frame and the amount of the 220 byte payload remaining in the current radio frame, the expedited Ethernet frame, or an expedited traffic stream including multiple Ethernet frames, may span several radio frames.

Radio frames including payloads generated from expedited Ethernet frames are built and transmitted until the traffic queue 114A is empty, and the transfer module 116 then resumes transfer of the interrupted, non-expedited Ethernet frame at its point of interruption, thereby avoiding loss of the interrupted frame. A last radio frame transmitted during a pre-emption interval, like a first interrupted frame, may include both expedited and non-expedited traffic.

Signalling of a traffic pre-emption or interruption between the pre-emptive scheduling system 102 and a corresponding receive-side apparatus may involve implicit or explicit indications. In the above example of Ethernet frames and radio frames, the header of a received Ethernet frame might be included in the payload of the first radio frame that is used to transport that Ethernet frame. Interruption of an Ethernet frame could thus be inferred by a receiver upon receiving a different Ethernet header in a radio frame before an end of frame or analogous signal has been received for a current Ethernet frame. A switch back to the original pre-empted Ethernet frame could be implied or inferred in a substantially similar manner, from an end of frame for the expedited frame. This is one example of an implicit or implied indication of a switch, in a communication traffic stream, from traffic of one traffic flow to traffic of a different traffic flow before all traffic of the one traffic flow has been transferred.

Various forms of explicit indication may be or become apparent to those skilled in the art. The transfer module 116 could be adapted to insert into a radio frame or other communication traffic stream an indication of the type of traffic in the stream, an indication of traffic type, or an indication of a switch in the stream from traffic of one type to traffic of another type, for example.

Exchange of such indications or signalling between a transmitting apparatus and a receiving apparatus, an example of which is described in further detail below with reference to FIG. 5, allows the receiving apparatus to differentiate expedited traffic from other traffic. Other receiver functions, such as an advancing function described below, could also be traffic type-dependent, in which case indications inserted into transmitted traffic by a transmitting apparatus may cause a receiving apparatus to handle the transmitted traffic in a particular way.

Configuration settings may also be exchanged between equipment at the ends of a communication link, so as to establish similar expedited handling schemes for transfer of traffic on that link, for instance.

Turning now to receive-side apparatus and functions, FIG. 5 is a block diagram of an apparatus 120 which implements another embodiment of the invention. The apparatus 120 includes a receiver 128, a configuration interface 124, and a transmitter 126 operatively coupled to a transmission traffic block advancing system 122. The transmission traffic block advancing system 122 includes a traffic type determination module 132, a transmission traffic block generator 134 operatively coupled to the traffic type determination module and to a memory 136 that includes multiple transmission traffic block buffers 138A through 138N, a remaining traffic amount determination module 142 operatively coupled to the memory 136, a transmission controller 144 operatively coupled to the remaining traffic determination module and to the transmitter 126, and a communication rate determination module 146 operatively coupled to the receiver 128, to the transmission controller, and to the transmitter.

As noted above with reference to FIG. 4, the apparatus 120 may be implemented in a network element or communication equipment or device that includes components other than those explicitly shown. In some implementations, the same equipment or device includes a transmit-side apparatus 100 (FIG. 4) and a receive-side apparatus 120 to support the techniques described herein for communications in opposite directions on a communication link.

Many of the components of the apparatus 120 may be implemented using hardware, software, firmware, or combinations thereof, and may be interconnected using various types of operative couplings. These components are therefore described below primarily in terms of their respective functions, which will enable a person skilled in the art to implement embodiments of the invention in many different ways.

The memory 136, however, would generally include one or more memory devices. These devices may be solid state memory devices or memory devices that use movable or even removable storage media. The transmission traffic block buffers 138A through 138N may then be implemented in respective storage areas of one memory device, or possibly in separate memory devices. Buffer sizes and other characteristics may be controlled through the configuration interface 124, based on user inputs and/or information received from another apparatus, for example.

The structure and operation of at least some of the other components of the apparatus 120 are complementary to those of related components of a transmit-side apparatus 100 (FIG. 4). The configuration interfaces 104, 124 may be the same type of interface and be compatible with each other where apparatus installations exchange control and/or configuration information, for example. The receiver 128 may also be compatible with a transmit-side transmitter 106. The transmitter 126 may also be similar to the transmitter 106, although in some embodiments the transmitter 106 and the transmitter 126 provide outputs for transmission over different media. The transmitter 106 might be a wireless transmitter whereas the transmitter 126 outputs Ethernet frames to a switching/routing node, for instance.

An advancing function of the apparatus 120 is provided by the transmission traffic block advancing system 122. In the case of the receiver 128 receiving communication traffic from a wireless communication link for subsequent transmission on a wired link or in a wired network, the transmission traffic block advancing system 122 is deployed at the egress from a wireless link/network and the ingress to a wired link/network. Based on a wireless communication traffic rate from the wireless link, and a wired network communication traffic rate, an advancing mechanism may start transmitting a transmission traffic block, illustratively a reconstructed Ethernet frame, before all traffic that is to be included in that frame is actually received from the wireless link. This can reduce latency and jitter.

This function, as well as the no-loss pre-empt function described above, are supported in the apparatus 120 by maintaining the separate traffic block buffers 138A through 138N for traffic blocks that include respective different types of traffic. Transmission traffic blocks that include time sensitive or other expedited traffic can then be sent to the transmitter 126 first, without losing partial transmission traffic blocks that include other traffic. When a low priority traffic stream is interrupted, for instance, a partial transmission traffic block stored in the corresponding transmission traffic block buffer can be retrieved when the interrupted stream resumes.

These operations will be considered in further detail below with reference to the components of the transmission traffic block advancing system 122.

Transmission of a traffic block may be advanced based on input and output rates and received and remaining traffic amounts, based on traffic types, or based on both rates/amounts and traffic types. In the context of rates and amounts, the transmitter 126 is operable to output traffic blocks on an output link, which might be a short-range local link to a co-located switching/routing node or other traffic processing device, as shown, or a communication link such as a network communication link to remote equipment. References herein to links and transmission should be interpreted accordingly.

Output traffic blocks include an amount of communication traffic that is received by the receiver 128 on an input link. In one embodiment, the input link is a wireless communication link, although the invention is not necessarily limited to wireless communication links.

The transmission controller 144 controls the actual output of transmission traffic blocks to the output link. If output of a traffic block at an output rate would not be completed before a remaining amount of traffic to be included in that block is received on the input link at a receive rate, then the transmission controller causes output of the traffic block on the output link to begin.

Suppose, for example, that a transmitting apparatus transmits Ethernet frames in a series of radio frames, and that the transmission traffic block generator 134 reconstructs Ethernet frames from received radio frames. The remaining traffic determination module 142 might already be aware of the amount of traffic, i.e., the number of radio frames, that are needed to fill a complete Ethernet frame, and can then determine how much of that traffic is yet to be received. For fixed-length Ethernet frames, the remaining traffic determination module 142, or a data store (not shown) that the module accesses to determine total traffic block length, could simply be pre-configured or pre-loaded with the known length. An Ethernet frame header in a first radio frame that includes a portion of an Ethernet frame might also or instead provide an indication of the length of the frame, in which case the remaining traffic determination module 142 may determine a total traffic block length from received traffic.

In the apparatus 120, the remaining traffic determination module 142 is operatively coupled to the memory 136, and accesses a traffic block buffer 138 to determine how much of the traffic that is to be included in a traffic block has already been received. Those skilled in the art will appreciate that this determination might also or instead be made through interactions directly with the receiver 128 and/or the traffic block generator 134.

The communication rate determination module 146 determines the communication rates of the receive/input and transmit/output links. There are many ways in which this function could be accomplished. An actual current receive or input rate could be determined based on received traffic, for example. Transmit or output rates could be determined in a similar manner, based on a current rate at which traffic blocks are output to the transmit or output link. Estimates of such rates may also or instead be used. Guaranteed minimum rates as defined in Service Level Agreements (SLAs) could be used to determine worst-case receive and transmit rates, for example.

Communication rates that are determined by the module 146 might include any or all of overall traffic rates, effective data rates, etc. The choice of which rates are determined by the module 146 and used by the transmission controller 144 to control output of a traffic block may be dependent on the formats in which traffic is transferred on the input link and the output link. If complete data units received on the receive link are inserted into traffic blocks to be transferred on the output link, then an overall traffic rate on the receive link might be used. If only a data portion or payload of a receive link data unit are used in constructing traffic blocks for output to the transmitter 126, then advancing decisions by the transmission controller 144 may instead use an effective data rate or other form of reduced communication rate.

The determined amounts and rates can be used by the transmission controller 144 to calculate transmit and remaining receive times for a traffic block. If the output of a traffic block is started while the transmit time for that block is less than the remaining receive time, then the traffic block buffer may underflow, which can actually increase jitter and result in latency- and/or jitter-related errors at a device that receives the traffic block. Controlling the start of traffic block output as disclosed herein reduces latency while avoiding buffer underflow.

As described above, a transmitting apparatus may interrupt certain types of traffic to transmit expedited traffic. Therefore, it is possible that the apparatus 120 might not continuously receive a complete block of certain types of traffic. Therefore, advancing may be limited to specific types of traffic, illustratively time sensitive traffic. Time sensitive traffic would not be interrupted, and thus the remaining receive time for such traffic can be more reliably determined.

In order to provide for traffic type selectivity, the traffic type determination module 132 determines types of received traffic, or is capable of at least determining whether received traffic is a predetermined type that is eligible for advancing. Implicit or explicit indications of traffic type or traffic pre-emption may be used for this purpose. The traffic type determination module 132 might determine traffic type based on an indication of type in a received communication traffic stream and/or an indication that a received stream of communication traffic was interrupted to transmit the received communication traffic, for example.

The transmission traffic block generator 134, based on the type determination by the traffic type determination module 132, stores a generated partial or complete traffic block to the appropriate buffer 138. This may involve adding received traffic to a previously stored partial traffic block or creating a new traffic block in a buffer 138.

Storage of partial traffic blocks in the buffers 138 while such blocks are being constructed provides receive-side support for the no-loss cut-through function described above. When a traffic flow or stream is interrupted, a partial traffic block preferably remains in the appropriate traffic block buffer 138. The transmission traffic block generator 134 creates a new traffic block when it detects that a current traffic type or flow has been pre-empted or interrupted. It will be apparent from the foregoing description that detection of a traffic pre-emption or interruption may be based on an implicit or explicit indication in received traffic. This detection may also be related to traffic type detection, in that a switch in traffic type may signal an interruption or resumption of a non-expedited traffic type for instance.

A stored partial traffic block that includes interrupted traffic need not necessarily be deleted upon detection of interrupting traffic. The transmission traffic block generator 134 can then continue constructing an interrupted traffic block when it has received all interrupting traffic and it begins receiving the remainder of interrupted traffic.

Operations of the transmission controller 144 and the modules 142, 146 that determine information used in advancing decisions may also be dependent on traffic type determinations. For type-specific advancing traffic amounts and rates might be determined only for traffic blocks that include traffic of a type that is eligible for advancing. Advancing the output of a traffic block that includes traffic of a non-eligible type could cause buffer underflow if that traffic type is subsequently interrupted by an expedited traffic type, for example.

It should be appreciated, however, that the apparatus 120 need not necessarily be limited to advancing of only certain traffic types. The apparatus 120 might receive traffic from a transmitting apparatus that does not support cut-through, for example. In this case, no traffic is interrupted at the transmitting apparatus, and accordingly received traffic of any type could be advanced.

Output control by the transmission controller 144 may be implemented in various ways. Where the transmitter 126 retrieves traffic blocks from the buffers 138, for example, the transmission controller 144 may be operatively coupled to the transmitter, as shown, to control when output of a traffic block starts by controlling the retrieval of traffic blocks by the transmitter. In another implementation, the memory 136 drives the transmit process and outputs traffic blocks to the transmitter 126 when they are ready for transmission. The transmission controller 144 might then be operatively coupled to the memory 136 to control the output of traffic blocks from the memory to the transmitter 126.

Embodiments of the invention have been described above primarily in the context of transmit- and receive-side apparatus. FIG. 6 is a flow diagram of a method according to another embodiment of the invention. The flow diagram of FIG. 6 includes both transmit-side operations at 152 through 164 and receive-side operations at 166 through 176.

The method 150 includes a transmit-side sorting operation 152, in which the types of received communication traffic, or more generally the traffic groups to which received communication traffic belongs, are determined. If transfer of previously received communication traffic into a communication traffic stream for transmission to a receiving communication device is not currently in progress, as determined at 154, then the received traffic is transferred into the traffic stream at 160. Otherwise, a determination is made at 156 as to whether the received traffic is a predetermined type of traffic, illustratively time sensitive traffic or other expedited traffic.

Received communication traffic that is not of the predetermined type is transferred into the traffic stream at 160 after the in-progress transfer completes at 158. The in-progress transfer is interrupted at 162 so that the traffic of the predetermined type can be transferred into the traffic stream. Transfer of interrupted traffic continues at 164 after the transfer of the received expedited traffic is complete.

Receive-side operations begin when traffic is received at 166. As described above, a receiving device outputs received traffic in traffic blocks. At 168, a determination is made as to whether all traffic for a traffic block has been received. Where a complete traffic block is ready for output, transmission of the traffic block on an output link is started at 170. Otherwise, advancing criteria may be considered at 172 through 176.

Traffic block advancing may be type-specific, as illustrated by the determination at 172. If an incomplete traffic block includes traffic that is not of a type eligible for advancing, then the traffic block is not transmitted until all traffic for that block is received. The output of a traffic block that includes eligible traffic, however, can be advanced. At 174, rates and traffic amounts are determined, and a decision is made at 176 as to whether a receive time for remaining traffic to be included in that traffic block is less than a transmit time for the traffic block. At least the remaining traffic amount may be determined several times, if the receive time exceeds the transmit time. The advancing decision time criterion might include the equal time condition, as shown, or provide a safety interval by which transmit time is to exceed remaining receive time.

Transmission of a traffic block begins at 170 when remaining traffic for the block will be received before transmission of the block would be completed, thereby avoiding output buffer underflow.

The method 150 represents one possible embodiment of the invention. Other embodiments may involve performing the illustrated operations in different ways, varying the order in which the operations are performed, and/or performing fewer or additional operations.

For example, transmit-side operations may involve including in the communication traffic stream an indication of traffic of the predetermined traffic group. Such an indication may be used at 172 to cause transmission of a traffic block that includes traffic belonging to the predetermined traffic group to begin before all traffic to be included in the traffic block has been received.

Another possible variation of the method 150 would be to advance all received traffic blocks regardless of traffic type, where cut-through is not provided or enabled at a transmitter from which traffic is received, for example.

The operation flow shown in FIG. 6 might also be different in other embodiments. The traffic receiving operation at 166, for example, might not necessarily begin only after an interrupted in-progress transfer is resumed at a transmitter. Reception of a traffic stream might be ongoing during the in-progress transfer at the transmitter, while the in-progress transfer is interrupted at the transmitter to transfer expedited traffic, and after the interrupted transfer resumes at the transmitter. Traffic may also be received while other receive-side operations are performed. A receiver might continue to receive traffic while an advancing decision is being made, for instance.

Similarly, the method 150 might not loop between 168 and 172 until traffic for a complete traffic block is received. Time insensitive traffic may have been interrupted at a transmitting apparatus, for example, and in this case time sensitive traffic may be received and processed before a complete block of time insensitive is received.

Further variations of the method 150 may be or become apparent to those skilled in the art, from the above system and apparatus descriptions for instance.

Embodiments of the invention may utilize traffic sorting, expedited queuing, and expedited scheduling to reduce latency and jitter that affects communication traffic. Cut-through traffic scheduling, for instance, may be used to reduce jitter. Measures may also be provided to avoid loss of a traffic flow that is being cut through, so as to reduce the effects of cut-through techniques on end-to-end application level data rates.

Transmit- and receive-side cut-through operations may be coordinated through an internal messaging, for example, such as explicit and implicit indications as described above. Cut-through scheduling could be turned on and off between a transmitter and a receiver, for instance.

Receive-side output advancing can further reduce latency and jitter. Multiple traffic buffers may be provided at a receive side installation to support no-loss cut-through transmit scheduling. In some embodiments, output advancing can be selectively applied to certain traffic types or to all traffic, depending on whether cut-through scheduling has been enabled at a transmitter.

These techniques may be implemented independently or in combination.

What has been described is merely illustrative of the application of principles of embodiments of the invention. Other arrangements and methods can be implemented by those skilled in the art without departing from the scope of the present invention.

For example, the specific divisions of functions shown in FIGS. 4 and 5 are intended solely for the purposes of illustration, and not to limit the scope of the invention. Other embodiments of the invention may be implemented using further or fewer components than shown, interconnected in a similar or different manner.

It should be appreciated that the techniques disclosed herein need not be restricted to implementation at a point of egress from a wireless communication network, or to any other particular point in a communication system. These techniques could similarly be applied to ingress traffic entering a wireless communication network, for instance.

It should also be appreciated that these techniques may be applied to handle traffic of more than two types. The present invention is not limited to handling only expedited traffic and non-expedited traffic. A hierarchical traffic type structure might include more than one expedited traffic class or type, such that traffic of one expedited traffic type could be preempted by traffic of a higher-priority expedited traffic type.

In addition, although described primarily in the context of methods and systems, other implementations of the invention are also contemplated, as instructions stored on a machine-readable medium for example.

We claim:

1. An apparatus comprising:
a transmitter operable to transmit a traffic block, the traffic block comprising an amount of communication traffic received on a receive communication link;
a transmission controller, operatively coupled to the transmitter, for controlling transmission of the traffic block, the transmission controller being operable to determine whether transmission of the traffic block at an output rate of the transmitter when only a portion of the amount of communication traffic to be included in the traffic block has been received on the receive communication link would be completed before a remaining amount of communication traffic to be included in the traffic block is received on the receive communication link at a receive communication rate of the receive communication link, and to cause the transmitter to begin transmitting the traffic block when only the portion of the amount of communication traffic to be included in the traffic block has been received where transmission of the traffic block at the output rate would not be completed before the remaining amount of communication traffic is received;

a traffic type determination module operatively coupled to the transmission controller and operable to determine whether communication traffic received on the receive communication link is a predetermined type of a plurality of types of communication traffic, wherein the transmission controller is operable to cause the transmitter to begin transmitting a traffic block comprising the received communication traffic before all communication traffic to be included in the traffic block is received on the receive communication link only where the received communication traffic is the predetermined type of communication traffic.

2. The apparatus of claim 1, further comprising:
a communication rate determination module operatively coupled to the transmission controller and operable to determine the output rate and the receive communication rate.

3. The apparatus of claim 1, wherein the traffic block has a predetermined size, the apparatus further comprising:
a remaining traffic amount determination module operatively coupled to the transmission controller and operable to determine the remaining amount of communication traffic based on the predetermined size of the traffic block and the portion of the amount of the communication traffic that has been received.

4. The apparatus of claim 1, further comprising:
a memory operatively coupled to the transmitter for storing traffic blocks to be transmitted by the transmitter, the memory comprising respective stores for storing traffic blocks that comprise communication traffic of the plurality of types.

5. The apparatus of claim 1, further comprising:
a memory, operatively coupled to the transmitter and to the transmission controller, comprising a store for storing the traffic block,
wherein the transmission controller is operable to control transmission of the traffic block by controlling output of the traffic block from the memory to the transmitter.

6. The apparatus of claim 1, wherein at least one of the transmitter and the transmission controller is implemented in one or more processing elements that execute software.

7. A method comprising:
receiving communication traffic on a receive communication link at a receive communication rate;
generating from the received communication traffic a traffic block for transmission at an output rate;
determining whether transmission of the traffic block at the output rate when only a portion of an amount of communication traffic to be included in the traffic block has been received on the receive communication link would be completed before a remaining amount of communication traffic to be included in the traffic block is received on the receive communication link at the receive communication rate; and causing transmission of the traffic block to begin when only the portion of the amount of communication traffic to be included in the traffic block has been received where transmission of the traffic block would not be completed before the remaining amount of communication traffic is received, the method further comprising:
determining whether communication traffic received on the receive communication link is a predetermined type of a plurality of types of communication traffic, wherein causing comprises causing transmission of the traffic block to start before all communication traffic to be included in the traffic block is received on the receive communication link only where the received communication traffic is the predetermined type of communication traffic.

8. The method of claim 7, further comprising:
storing traffic blocks including communication traffic of the plurality of types.

9. The method of claim 7, further comprising:
storing the traffic block in a memory,
wherein causing comprises causing output of the traffic block from the memory to an output communication link.

10. An apparatus comprising:
a communication traffic type determination module operable to receive communication traffic on a receive communication link, and to determine whether the received communication traffic is a predetermined type of a plurality of types of communication traffic; and a transmission controller operatively coupled to the communication traffic type determination module and operable to control transmission of a traffic block comprising an amount of the received communication traffic, the transmission controller enabling transmission of a traffic block comprising received communication traffic of the predetermined type to start at a time before all communication traffic to be included in the traffic block is received on the receive communication link, wherein the communication traffic type determination module is operable to determine whether the received communication traffic is the predetermined type of traffic based on at least one of:

an indication of type in a received communication traffic stream; and an indication that a received stream of communication traffic was interrupted to transmit the received communication traffic.

11. The apparatus of claim 10, further comprising:
a traffic block generator operatively coupled to the communication traffic type determination module and operable to generate traffic blocks for transmission; and
a memory operatively coupled to the traffic block generator for storing the traffic blocks,
wherein the traffic block generator is further operable to maintain respective traffic block buffers in the memory for an interrupted communication traffic stream and an interrupting communication traffic stream where a stream of communication traffic was interrupted to transmit the received communication traffic.

12. The apparatus of claim 10, wherein the transmission controller enables transmission of a traffic block comprising received communication traffic of the predetermined type to start at a time when transmission of the traffic block at an output rate would not be completed before a remaining amount of communication traffic to be included in the traffic block is received on the receive communication link at a receive communication rate of the receive communication link.

13. The apparatus of claim 10, wherein at least one of the communication traffic type determination module and the transmission controller is implemented in one or more processing elements that execute software.

14. A method comprising:
receiving communication traffic on a receive communication link;
determining whether the received communication traffic is a predetermined type of a plurality of types of communication traffic; and
enabling transmission of a traffic block comprising the received communication traffic to start at a time before all communication traffic to be included in the traffic block is received on the receive communication link, where the received communication traffic is the predetermined type of communication traffic,
wherein enabling comprises causing transmission of the traffic block to start at a time when transmission of the traffic block at an output rate would not be completed before a remaining amount of communication traffic to be included in the traffic block is received on the receive communication link at a receive communication rate of the receive communication link.

15. The method of claim 14, wherein determining comprises detecting, in a received communication traffic stream, at least one of: an indication of traffic type, and an indication that communication traffic of a different type was interrupted to transmit the received communication traffic.

16. An apparatus comprising:
a communication traffic sorter operable to determine to which traffic group of a plurality of traffic groups received communication traffic belongs; and
a communication traffic transfer module, operatively coupled to the communication traffic sorter, and operable to transfer received communication traffic of a predetermined traffic group of the plurality of traffic groups into a communication traffic stream for transmission to a receiving communication device, to transfer received communication traffic of a traffic group other than the predetermined traffic group into the communication traffic stream where no received communication traffic belongs to the predetermined traffic group, and to interrupt transfer of received communication traffic of the other traffic group into the communication traffic stream in order to transfer traffic of the predetermined traffic group into the communication traffic stream where communication traffic of the predetermined traffic group is received during transfer of communication traffic of the other traffic group to the communication traffic stream,
wherein the communication traffic transfer module is further operable to include in the communication traffic stream an indication of traffic of the predetermined traffic group, the indication causing the receiving communication device to begin transmitting a traffic block that includes traffic belonging to the predetermined traffic group before the receiving communication device receives an amount of communication traffic to be included in the traffic block,
wherein the indication comprises at least one of:
an indication of the traffic group to which communication traffic in the communication traffic stream belongs;
an indication of a switch in the communication traffic stream from traffic of one traffic group to traffic of the predetermined traffic group; and
an indication of a switch in the communication traffic stream from traffic of one traffic flow to traffic of a different traffic flow before all traffic of the one traffic flow has been transferred into the communication traffic stream.

17. A method comprising:
determining to which traffic group of a plurality of traffic groups received communication traffic belongs;
transferring received communication traffic of a predetermined traffic group of the plurality of traffic groups, or, where no received communication traffic belongs to the predetermined traffic group, received communication traffic of another traffic group, into a communication traffic stream for transmission to a receiving communication device;
interrupting transfer of received communication traffic of the other traffic group into the communication traffic stream in order to transfer traffic of the predetermined traffic group into the communication traffic stream where communication traffic of the predetermined traffic group is received during transfer of communication traffic of the other traffic group into the communication traffic stream;
including in the communication traffic stream an indication of traffic of the predetermined traffic group, the indication causing the receiving communication device to be in transmitting a traffic block that includes traffic belonging to the predetermined traffic group before the receiving communication device receives an amount of communication traffic to be included in the traffic block.

18. The apparatus of claim 16, wherein at least one of the communication traffic sorter and the communication traffic transfer module is implemented in one or more processing elements that execute software.

19. A non-transitory machine-readable medium storing instructions which when executed perform the method of claim 7.

20. A non-transitory machine-readable medium storing instructions which when executed perform the method of claim 14.

21. A non-transitory machine-readable medium storing instructions which when executed perform the method of claim 17.

* * * * *